United States Patent [19]
Fowler

[11] Patent Number: 6,032,958
[45] Date of Patent: Mar. 7, 2000

[54] BI-DIRECTIONAL PRESSURE-ENERGIZED METAL SEAL

[75] Inventor: John H. Fowler, Houston, Tex.

[73] Assignee: Hydril Company, Houston, Tex.

[21] Appl. No.: 09/052,310

[22] Filed: Mar. 31, 1998

[51] Int. Cl.$^7$ ................................................. E21B 33/00
[52] U.S. Cl. ...................... 277/337; 277/341; 277/606; 277/611; 277/626; 277/627
[58] Field of Search ................................. 277/331, 334, 277/341, 340, 337, 603, 606, 609, 611, 612, 630, 627, 650, 626, 639; 285/370, 397

[56] References Cited

U.S. PATENT DOCUMENTS

| | | | |
|---|---|---|---|
| 2,988,148 | 6/1961 | Conrad et al. | 277/337 |
| 3,485,142 | 12/1969 | Kutas et al. | 92/169.1 |
| 3,784,214 | 1/1974 | Tamplen | 277/116.8 |
| 4,299,332 | 11/1981 | Pechacek | 220/378 |
| 4,361,331 | 11/1982 | Kohler | 277/609 |
| 4,390,186 | 6/1983 | McGee et al. . | |
| 4,444,400 | 4/1984 | Norman . | |
| 4,486,002 | 12/1984 | Riess et al. | 251/529 |
| 4,545,312 | 10/1985 | Ingram | 112/256 |
| 4,569,540 | 2/1986 | Beson | 285/93 |
| 4,601,498 | 7/1986 | Haugen . | |
| 4,646,845 | 3/1987 | Boeker . | |
| 4,709,725 | 12/1987 | Morrison . | |
| 4,747,606 | 5/1988 | Jennings . | |
| 4,749,047 | 6/1988 | Taylor . | |
| 4,751,965 | 6/1988 | Cassity . | |
| 4,771,828 | 9/1988 | Cassity . | |
| 4,771,832 | 9/1988 | Bridges | 166/380 |
| 4,791,987 | 12/1988 | Cassity et al. . | |
| 4,813,692 | 3/1989 | Halling et al. | 277/626 |
| 4,832,381 | 5/1989 | Boulton . | |
| 4,842,061 | 6/1989 | Nobileau . | |
| 4,848,777 | 7/1989 | Zollo et al. . | |
| 4,911,245 | 3/1990 | Adamek et al. . | |
| 4,911,411 | 3/1990 | Jones et al. . | |
| 5,026,074 | 6/1991 | Hoes et al. . | |
| 5,044,672 | 9/1991 | Skeels et al. . | |
| 5,058,906 | 10/1991 | Adamek et al. . | |
| 5,067,734 | 11/1991 | Boehm, Jr. . | |
| 5,070,942 | 12/1991 | McInnes . | |
| 5,090,871 | 2/1992 | Story et al. | 285/93 |
| 5,174,376 | 12/1992 | Singeetham . | |
| 5,183,268 | 2/1993 | Wong et al. . | |
| 5,193,616 | 3/1993 | Hynes . | |
| 5,211,226 | 5/1993 | Hendrickson et al. . | |
| 5,224,715 | 7/1993 | Downes et al. . | |
| 5,284,205 | 2/1994 | Smith . | |
| 5,370,153 | 12/1994 | Galle . | |
| 5,375,812 | 12/1994 | Kent . | |
| 5,456,314 | 10/1995 | Boehm, Jr. et al. . | |
| 5,464,063 | 11/1995 | Boehm, Jr. . | |
| 5,662,341 | 9/1997 | Ezell et al. . | |
| 5,941,530 | 8/1999 | Williams | 277/322 |
| 5,944,319 | 8/1999 | Kohlman | 277/314 |

Primary Examiner—Anthony Knight
Assistant Examiner—Alison K. Pickard
Attorney, Agent, or Firm—Rosenthal & Osha L.L.P.

[57] ABSTRACT

A seal system for sealing between a pair of members is provided wherein a pair of substantially aligned walls on inner faces of the members have internal frustoconical portions. A metal ring includes a pair of lips with external frustoconical portions which sealingly engage the internal frustoconical portions. The metal ring includes at least one convolution between the lips. The convolution permits axial extension of the metal ring upon application of external pressure to the ring.

16 Claims, 1 Drawing Sheet

US 6,032,958

BI-DIRECTIONAL PRESSURE-ENERGIZED METAL SEAL

BACKGROUND OF THE INVENTION

Maintaining control of fluid pressures experienced within a wellhead equipment requires proper sealing around the tubular elements in the wellhead equipment. Thus, various types of annular seals which seal around tubular elements have been developed over the years. These seals typically fall under one of three categories: elastomer, elastomer combined with metal, or metal seals.

Permanently-installed wellhead equipment requires seals that retain high sealing integrity when exposed to extreme pressures, or pressure fluctuations, extreme temperatures or temperature fluctuations, corrosive fluids, and dirt. Elastomer materials may break down when exposed to extreme temperature or corrosive fluids. As a result, metal seals are typically the preferred type of seal since they do not share the temperature sensitivity problems of elastomeric materials. The metal seals can be made from high-strength, corrosion-resistant materials which resist physical damage and corrosion.

SUMMARY OF THE INVENTION

In accordance with one aspect of the invention, a seal system for sealing between a pair of members comprises a pair of substantially aligned peripheral walls on inner faces of the members, each peripheral wall having an internal frustoconical portion. A metal ring includes a pair of lips with external frustoconical portions sealingly engaging the internal frustoconical portions. The metal ring includes a pressure responsive surface configured to axially extend the metal ring upon application of external pressure.

In accordance with another aspect of the invention, a seal system for sealing between a pair of members comprises a pair of substantially aligned peripheral walls on inner faces of the members, each peripheral wall having an internal frustoconical portion. A metal ring includes a pair of lips with external frustoconical portions sealingly engaging the internal frustoconical portions. The lips are spaced apart by a groove which permits axial extension of the metal ring upon application of external pressure.

In accordance with yet another aspect of the invention, a seal system for sealing between a pair of members comprises a pair of substantially aligned peripheral walls on inner faces of the members, each peripheral wall having an internal frustoconical portion. A metal ring includes a pair of lips with external frustoconical portions for sealingly engaging the internal frustoconical portions. The metal ring includes at least one convolution between the lips. The convolution is configured to move the lips outwardly with respect to each other upon application of external pressure. A spacer is disposed in a groove defined by the convolution. The spacer controls the clearance between adjacent surfaces of the convolution.

DESCRIPTION OF THE PREFERRED EMBODIMENTS

Figure 1:
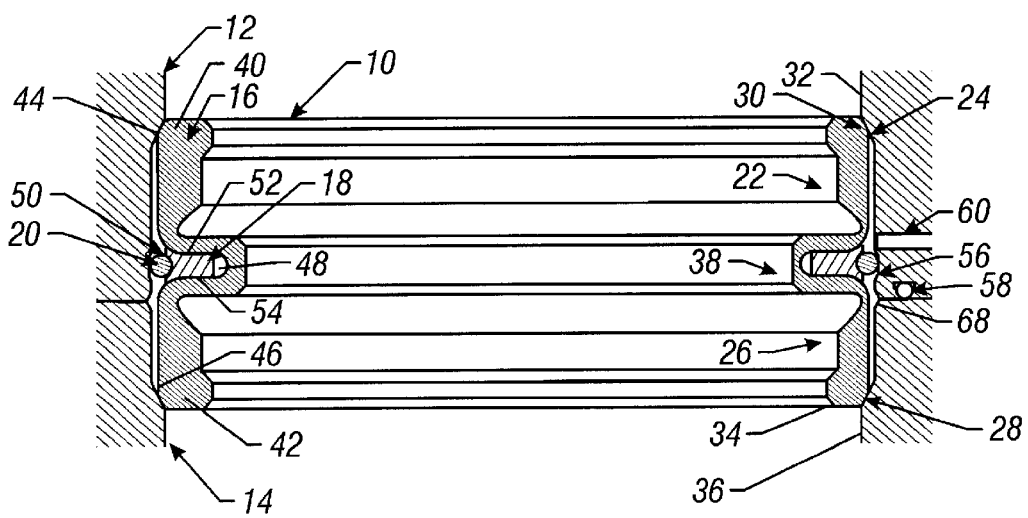
FIG. 1 is a cross-sectional view of an embodiment of the invention.

Referring to the drawings wherein like characters are used for like parts throughout the several views, FIG. 1 illustrates a seal assembly 10 situated between an upper tubular member 12 and a lower tubular member 14. The seal assembly 10 includes a seal ring 16, a spacer 18, and an o-ring 20.

The seal ring 16 includes an upper sealing lip 22 with frustoconical sealing flank 30 and a lower sealing lip 26 with frustoconical sealing flank 34. The sealing flank 30 mates with a frustoconical sealing surface 24 on an inner peripheral wall 32 of the member 12. The sealing flank 34 mates with a frustoconical sealing surface 28 on an inner peripheral wall 36 of the member 14. The interference fit between the flanks 24 and 28 and the surfaces 30 and 34, respectively, provide a tight seal between the members 12 and 14.

The sealing lips 22 and 26 are spaced apart by a central convolution 38, which permits the sealing lips 22 and 26 to extend axially upon application of external pressure to the seal ring 16. The outer ends 40 and 42 of the sealing lips 22 and 26, respectively, may be made thicker to provide better resistance to axial deformation near the sealing contact region 44 and 46 and to minimize twisting of the lips.

The spacer 18 is disposed in a groove 48 defined by the convolution 38. The spacer 18 is a metal ring which is split to facilitate installation in the groove 48. The spacer 18 includes a groove 50 which is shaped to receive the o-ring 20. The o-ring 20 is stretched around the spacer 18 to secure the spacer 18 to the seal ring 16.

The clearances between the convolution 38 and the upper and lower surfaces 52 and 54 of the spacer 18 are controlled to a gap size that will prevent collapse of the convolution 38 to the extent that the convolution 38 is overstressed. The o-ring 20 cooperates with a groove 56 in the inner peripheral wall 32 of the member 12 to retain the seal assembly 10 in the member 12 when the member 12 is detached from the member 14.

The seal ring 16 is made from metal, preferably a high-strength, corrosion-resistant metal (e.g. Nickel Alloy N07718) A soft metal plating may be provided on the seal ring 16 to enhance the sealing capability of the seal ring.

A seal 58 is provided between the members 12 and 14 to provide a temporary seal between the members 12 and 14 for the purpose of testing the installation of the seal assembly 10. Pressure may be applied to the seal assembly 10 through the test port 60.

Figure 2:
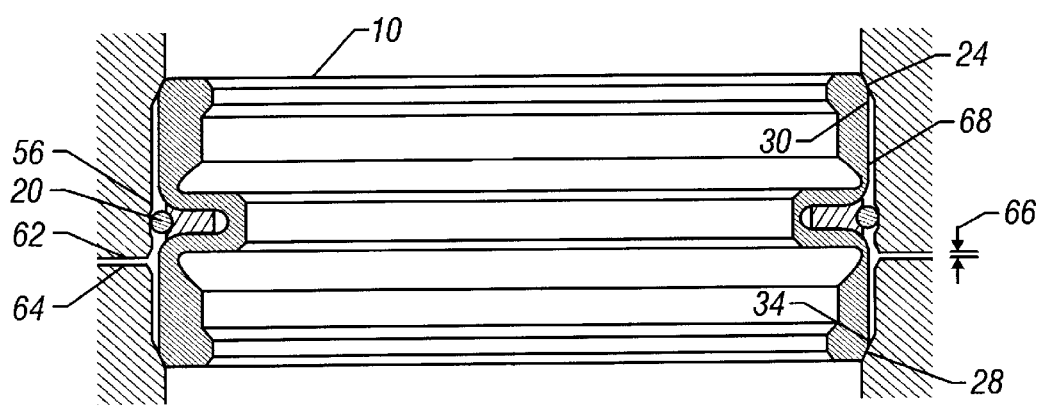
FIG. 2 is a cross-sectional view of an embodiment of the invention during the initial stages of installing an embodiment of a seal assembly of the invention.

In operation, the seal assembly 10 is initially attached to the member 12 by fitting the o-ring 20 into the groove 56 in the inner peripheral wall 32 of the member 12. Then the face 62 of the member 12 is advanced toward the face 64 of the member 14 until the sealing flanks 24 and 28 contact the sealing surfaces 30 and 34, respectively, as shown in FIG. 2.

When the sealing flanks 24 and 28 make this initial contact with the sealing surfaces 30 and 34, there is a gap between the faces 62 and 64 of the members 12 and 14. As the face 62 is further advanced toward face 64, the sealing surfaces 30 and 34 move toward one another, thereby compressing the seal ring 16. The compression of the seal ring 16 causes some axial movement of the sealing lips 22 and 26 toward each other, which in turn slightly compresses the convolution 38. The spacer 18 prevents excessive compression of the convolution 38.

As the seal ring 16 is compressed, the sealing lips 22 and 26 also move radially inward such that the lips are placed in circumferential compression. Thus, by the time the faces 62 and 64 contact, the seal ring 16 has stored elastic force, both from the radial compression of the sealing lips 22 and 26 and the axial compression of the convolution 38. This force is directed toward achieving a tight sealing contact between the sealing flanks 30 and 34 of the seal ring 16 and the sealing surfaces 24 and 28 of the members 12 and 14, respectively.

When the two vessels are completely latched together as shown in FIG. 1, pressure is applied through the test port 60 to the seal assembly 10. The outer surface 68 of the seal assembly 10, together with the interior of the convolution 38 (or the groove 48), is pressurized. The pressure acting on the outer surface 68 tends to move the sealing lips 22 and 26 radially inward and to lessen the sealing force on the sealing flanks 30 and 34 of the seal assembly 10. However, the pressure in the groove 48 moves the sealing lips 22 and 26 axially apart, thus maintaining the sealing force and counterbalancing the radial movement of the lips.

The amount of pressure energization of the seal ring 16 can be controlled by adjusting the flexibility of the convolution 38, the rigidity of the sealing lips 22 and 26, and the angle of the frustoconical flanks and surfaces. The ratio of the radial inward movement of the sealing lips 22 and 26 to the axial extension of the convolution 38 in each direction must be no more than the tangent of the angle of the frustoconical surface to ensure that the sealing force is not diminished.

When the seal assembly 10 has been tested, the members 12 and 14 can be put into service. Internal pressure acting in the seal ring 16 will cause the seal ring 16 to be energized radially outward against the sealing surfaces 24 and 28 while also causing the convolution 38 to move back to its normal position. The convolution 38 is again protected from being crushed by the spacer 18. This configuration will also adjust to compensate for any axial relative movement of the members 12 and 14 due to the resilience of the sealing lips 22 and 26 and the convolution 38.

While the invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A seal system for sealing between a pair of members having substantially aligned inner peripheral walls, comprising:
   a metal ring having an outer peripheral wall with sealing surfaces for sealing contact with corresponding sealing surfaces on the inner peripheral walls, the outer peripheral wall being provided with a convolution, wherein the convolution permits axial extension of the metal ring upon application of external pressure to the outer peripheral wall; and
   a rigid member disposed within the convolution to prevent the convolution from collapsing.

2. The seal system of claim 1, wherein the rigid member is a split ring.

3. The seal system of claim 2, wherein the rigid member is secured to the metal ring by an o-ring.

4. The seal system of claim 3, wherein the o-ring forms a seal between the metal ring and one of the inner peripheral walls.

5. The seal system of claim 1, further including a nonmetallic test seal located between contacting surfaces of the members.

6. The seal system of claim 5, further including a port for communicating pressure to a space between the metal ring and the test seal.

7. The seal system of claim 1, further including a retainer for securing the metal ring to one of the inner peripheral walls when the members are unattached.

8. The seal system of claim 7, wherein the retainer includes a groove in one of the inner peripheral walls and an o-ring on the metal ring for cooperative engagement with the groove.

9. The seal system of claim 8, wherein the o-ring forms a seal between the metal ring and one of the inner peripheral walls.

10. The seal system of claim 1, wherein the sealing surfaces include frustoconical portions.

11. The seal system of claim 10, wherein the ratio of radial movement of the outer peripheral wall to the axial extension of the metal ring is equal to or less than the tangent of the angle of the frustoconical portions when external pressure is applied.

12. The seal system of claim 10, wherein a gap is defined between the members when the frustoconical portions on the sealing surfaces initially contact, thereby allowing the metal ring to be compressed when the members are brought into contact with each other to close the gap.

13. A seal system for sealing between a pair of members, comprising:
   a pair of substantially aligned peripheral walls on inner faces of the members, each peripheral wall having an internal frustoconical portion;
   a metal ring having a pair of lips with external frustoconical portions for sealingly engaging the internal frustoconical portions, the metal ring having at least one convolution between the lips, wherein the convolution permits the lips to move outwardly with respect to each other upon application of external pressure to the metal ring; and
   a rigid member disposed within the convolution to prevent the convolution from collapsing.

14. The seal system of claim 13, wherein the spacer is a split ring.

15. The seal system of claim 14, further including a retainer for securing the split ring to the metal ring.

16. A seal system for sealing between a pair of members, comprising:
   a pair of substantially aligned peripheral walls on inner faces of the members, each peripheral wall having an internal frustoconical portion;
   a metal ring having a pair of lips with external frustoconical portions for sealingly engaging the internal frustoconical portions, the metal ring having at least one convolution between the lips, the convolution being adapted to axially extend the metal ring upon application of external pressure;
   a split ring disposed in a groove defined by the convolution, wherein the split ring controls a clearance between opposing surfaces of the groove so that the convolution is prevented from collapsing;
   an o-ring arranged in a groove in the split ring for securing the split ring to the metal ring; and
   one of the peripheral walls having a retaining groove in cooperative engagement with the o-ring, the o-ring and the retaining groove being configured to secure the metal ring to the peripheral wall when the members are unattached.

* * * * *